Sept. 12, 1944.   D. G. MAGILL   2,357,837
CONTAINER OVERCAP AND METHOD OF APPLYING SAME
Filed Nov. 13, 1939   2 Sheets-Sheet 1
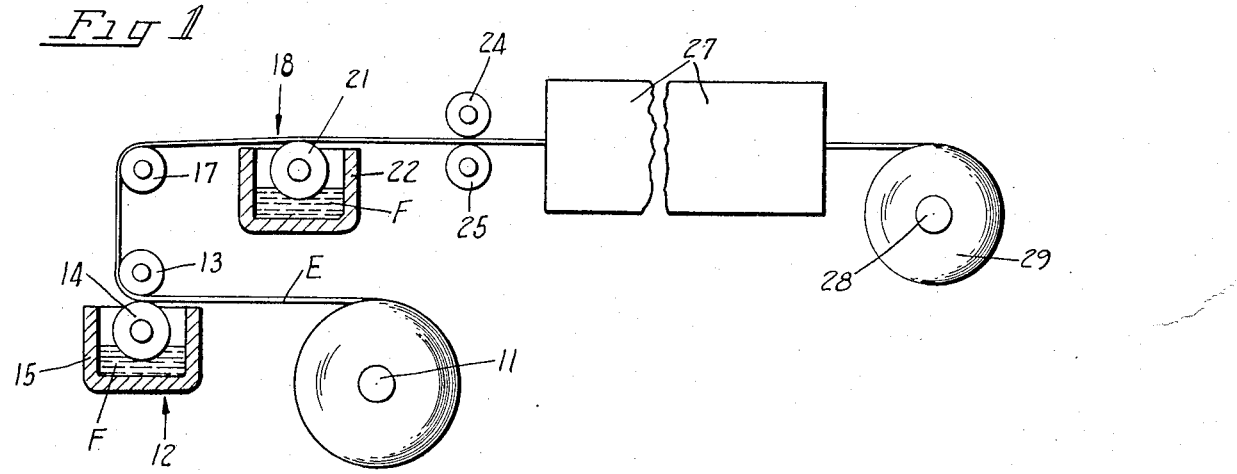
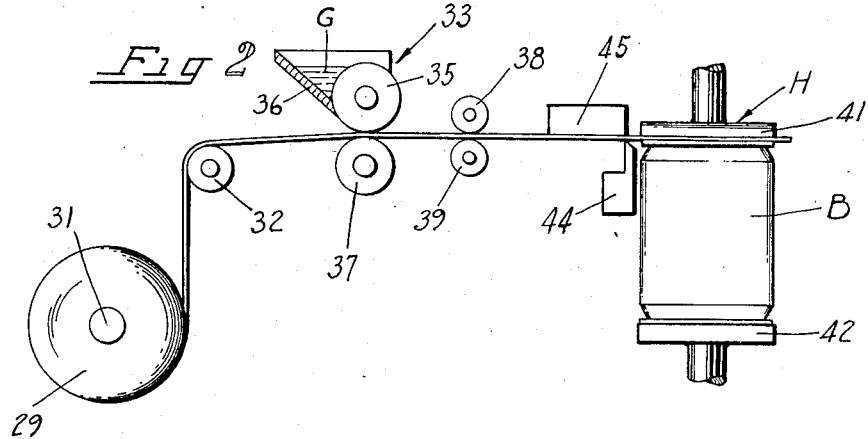
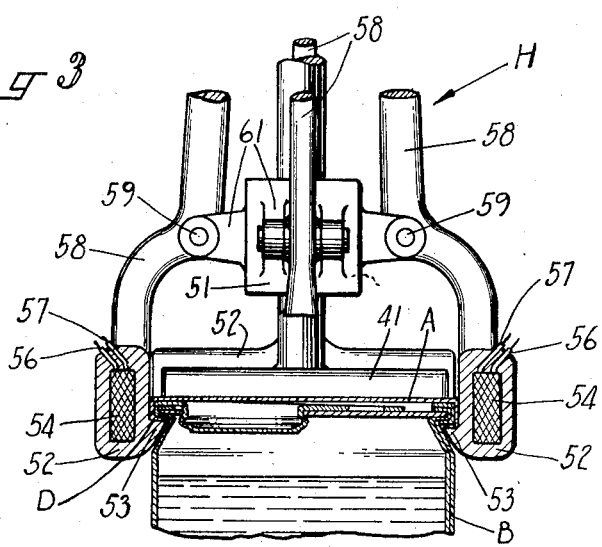

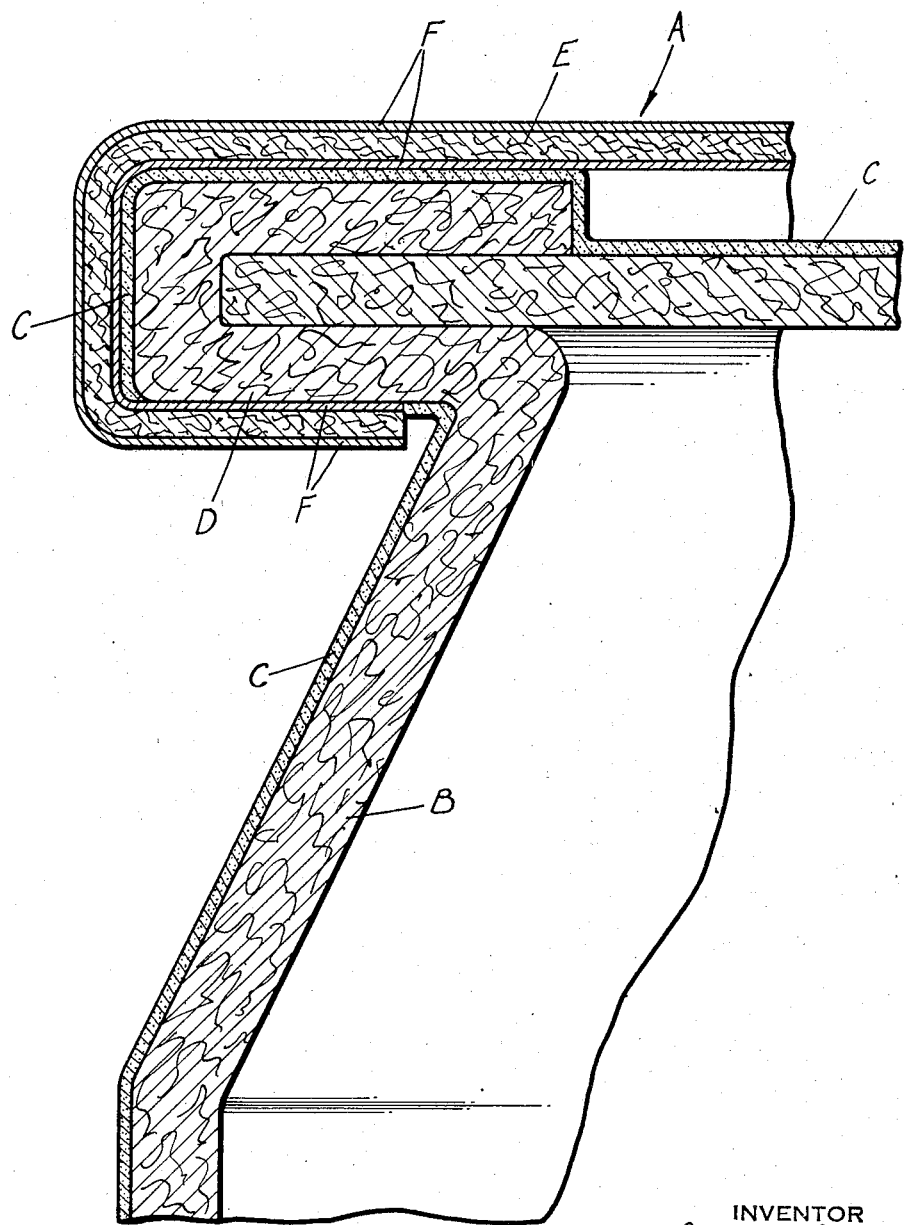

Patented Sept. 12, 1944

2,357,837

UNITED STATES PATENT OFFICE 2,357,837

CONTAINER OVERCAP AND METHOD OF APPLYING THE SAME

Donald G. Magill, Great Neck, N. Y., assignor to American Can Company, New York, N. Y., a corporation of New Jersey Application November 13, 1939, Serial No. 304,273

3 Claims. (Cl. 226—83)

The present invention relates to containers and has particular reference to a thermoplastic waterproof and moistureproof overcap applied by a method which will permanently secure the overcap to a fibre container to protect the latter against contamination by foreign matter such as dust or water.

In the manufacture of certain containers, such as for example, single use or one trip fibre milk containers of the type disclosed in United States Patent 2,085,979, issued July 6, 1937, to John M. Hothersall, on Container, it is sometimes desirable for sanitary reasons to protect the top of the container against contamination. The outside surfaces of containers of this type are usually covered with a coating material such as wax which does not readily bond with ordinary adhesives such as those used in securing overcaps to uncoated containers.

The instant invention contemplates solving this problem by preparing a preferably thin transparent protective carrier film of cellulosic material such as "Cellophane" or glassine or non-cellulosic material such as "Pliofilm" or "Koroseal" with a thermoplastic waterproof and moistureproof coating, producing a container overcap from this film, applying the same to a container and fusing it in place by heat so that it will be secured to the container in a permanent bond as contradistinguished from the temporary bond used on returnable glass bottles which would be fouled by such a permanent bond.

An object, therefore, of the invention is the provision of a celluosic or non-cellulosic overcap for a fibre container wherein the overcap is waterproof and moistureproof and may be attached to the container in a permanent bond so that tearing it away or otherwise removing it will be difficult to accomplish without marring or destroying part of the surface of the container or without leaving a tell-tale part of the overcap clinging to the container as evidence of tampering.

Another object is the provision of a method of producing and applying such an overcap wherein a cellulosic or non-cellulosic transparent carrier film is prepared with a thermoplastic coating, which when applied as an overcap to a wax covered fibre container, may be secured in place by heat which fuses the overcap through the wax coating, thereby securing it to the fibre base of the container in a permanent bond which remains intact even when the main portion of the overcap is torn off to open the container.

Another object is the provision of such a method of producing and applying an overcap of this character wherein the overcap is moistureproof and waterproof and therefore is protected against the softening effect of moisture or water, such an overcap protecting the container itself against moisture and water or other foreign matter.

Another object is the provision of such a method of producing and applying an overcap wherein the carrier film is coated on both sides with a thermoplastic moistureproof and water proof material which serves the double function of means for sealing the overcap firmly and permanently to the container while also providing a protection against water and moisture, either from the outside or from underneath the overcap.

Numerous other objects and advantages of the invention will be apparent as it is better understood from the following description, which, taken in connection with the accompanying drawings, discloses a preferred embodiment thereof.

Referring to the drawings:

Figures 1 and 2 are schematic views illustrating principal parts of an apparatus for carrying out the steps of the instant method invention, parts being broken away and other parts being shown in section, Fig. 1 showing the first part of the process and Fig. 2 the latter part;

Fig. 3 is an enlarged detail of a portion of the overcap applying apparatus shown in place on a container, the container and parts of the apparatus being shown in section; and Fig. 4 is a greatly enlarged sectional view taken through one corner of a wax covered fibre container with an overcap secured thereto in accordance with the steps of the instant method invention.

As a preferred embodiment of the invention the drawings disclose a sheet material cap A (Fig. 4) which is adapted to be applied over the top end of a container B of the character shown in the Hothersall patent hereinbefore mentioned and which has an overall coating C of wax. The container B is formed with an overhanging peripheral ledge or rim D and the outer edges of the overcap are adapted to be wiped over this rim and permanently secured to the under surface thereof by fusing the overcap, through the wax coating, to the fibre base of the container. Such a fusing action sticks the overcap so tightly in place that it must be torn and completely destroyed to gain access to the top of the container, the fused edges of the torn overcap remaining in place on the container as evidence that the overcap has been removed.

The base stock of the overcap A is preferably a thin cellulosic transparent carrier film or web E such as for example, "Cellophane" or glassine which, in accordance with the steps of the instant method invention, is coated on both surfaces with a waterproof and moistureproof thermoplastic coating or lacquer F. This coating may be of any suitable thermoplastic adhesive composition, such as for example the coating disclosed in United States Patent 1,997,583, issued April 16, 1935, to Maurice Valentine Hitt, on Composition of matter and material made therefrom.

The adhesive coating F after being applied to the web is dried and the web is then rolled into a reel ready for shipment or storage. If desired the entire method may be of a continuous nature but it has been found more practical to roll the dried web into reels and store them in a convenient place ready for use. This constitutes the first part of the process and is indicated in Fig. 1.

When ready for use, one surface of the web is preferably coated with a paraffin lubricant G to facilitate subsequent die working of the web. A section of the web is then advanced into position over the top end of a container to be capped and this section is severed from the web. Thereafter the severed section is crimped into place on the container with a heated crimping head H, Fig. 3. This constitutes the latter part of the process as covered in the step shown in Fig. 2.

In one form of apparatus for carrying out the steps of the invention, a roll of the carrier web E is mounted on a shaft 11 (Fig. 1) for unwinding and the web is fed into a coating device 12 which applies the thermoplastic adhesive coating F to one side of the web. This coating device includes a pair of upper and lower feed rollers 13, 14 between which the web passes. The lower roller rotates in a bath of the coating material retained in a reservoir 15 and thus carries the coating material up and onto the web as the latter advances through the device.

The opposite surface of the web is coated in a similar manner. For this purpose the web is directed upwardly over an idler roller 17 reversing its first direction and then continues back along a horizontal path of travel through a second coating device 18. This coating device includes an applying roller 21 which engages the now lower or uncoated surface of the web. The roller 21 rotates in a bath of the thermoplastic coating material F retained in a reservoir 22 and thus carries the coating up onto the web as the latter advances along its path of travel. A pair of feed rollers 24, 25 advance the web along this part of its path of travel.

Drying of the coating material on the web is preferably effected in an oven 27 which may be maintained at drying heat in any suitable manner. The coated web passes through this oven and emerges therefrom in a fully dried condition.

Immediately after drying, the web is wound onto a rotating shaft 28 and is thus formed into a roll or reel 29. In this condition the web is ready for shipment to the factory for use or may be stored away for future delivery.

When ready for use a roll 29 of the coated web E is mounted on a bar 31 (Fig. 2) and the web is threaded through devices which will now be explained. The web first passes up over an idler roller 32 and then along a substantially horizontal path of travel through a lubricating device 33. It is this device which applies a coating of the paraffin lubricant G to the web as hereinbefore mentioned. The lubricating device includes an applying roller 35 which rotates in a bath of the paraffin lubricant G retained in a reservoir 36. The roller thus carries the lubricant down and applies it to the engaging surface of the web as the latter is advanced. A pressure roller 37 located below the lubricating device holds the web up against the applying roller. The lubricant is preferably applied to the side of the web which will come in contact with the heated crimping head H hereinbefore mentioned to prevent the overcap from sticking to the head parts. A pair of intermittently rotating feed rollers 38, 39 advance the web in time with the other moving parts of the apparatus.

A each operation of the feed rollers 38, 39 the web is advanced a distance sufficient to expose enough of it to make one overcap. This portion of the web is positioned between a clamp plate 41 of the crimping head H and the top of a container B to be capped. The container is carried on a vertically movable lifter plate 42 which is actuated at the proper time by any suitable means operating in time with the other moving parts of the apparatus.

With the advanced portion of the web in position over the container, the clamp plate moves down and clamps the web against the container top. This clamped portion of the web is then cut off as hereinbefore mentioned to provide a blank from which the overcap may be produced. The blank is large enough to cover the entire container top and also allows for an overhanging marginal portion extending entirely around the container top.

Severing of the overcap blank from the web is preferably done by a vertically movable knife or blade 44 which is actuated in any suitable manner in time with the other moving parts of the apparatus. At the proper time the knife moves up against the web and shears it off against a stationary shearing block 45 which is located adjacent the path of travel of the web on the side opposite the knife.

The severing of the web to produce the overcap blank is immediately followed by the operation of forming the blank into an overcap and securing it to the container. For this purpose the lifter plate 42 now moves up and thus lifts the container and its superimposed overcap blank into the crimping head H against the resistance of the clamp plate.

The crimping head H includes a stationary head frame 51 (Fig. 3) which carries a plurality of movable squeezer jaws 52. In the present disclosure the container is square in cross-section and hence there are four straight jaws 52, one for each side of the container. These jaws are formed with a projecting ledge 53 which is adapted to engage against the under surface of the container rim D when the jaws are in sealing position. Each jaw is also heated by an electric coil 54 disposed inside the jaw. The coils are adapted to be connected by lead wires 56, 57 to any suitable source of electric energy.

The crimping jaws 52 are also adapted to be moved inwardly and outwardly in relation to the container. For this purpose they are formed on the lower ends of movable arms 58 which are mounted on pivot pins 59 carried in lugs 61 formed on the head frame 51. The arms are swung inwardly and outwardly at the proper time by any suitable means operating in time with the other moving parts of the apparatus. Normally the arms and the jaws carried thereby are in an open or outwardly swung position so that the upper end of a container B will enter between the jaws when the container is lifted into the head.

Thus at the time a container B and its superimposed overcap A moves into the head H, the open jaws engage the cut and overhanging edges of the overcap blank and wipe them down against the side of the container and form an inverted cup-shaped overcap. The open jaws hold these edges of the overcap in this position when the top of the container reaches the limit of its movement against the bottom of the head frame, the clamp plate being now disposed within the head frame as shown in Fig. 3.

While the container is held in this uppermost position by the lifter plate 42, the hot jaws 52 move in around the upper end of the container. With this movement, the jaws tuck the depending edges of the overcap under the container rim D and simultaneously force the edges of the overcap into tight engagement with the under surface of the rim. The heat in the jaws which preferably ranges from 385° to 425° F. fuses the marginal portions or edges of the overcap to the container into a permanent bond.

This fusion actually penetrates and disperses the wax coating C on the container at the overcap joint and thereby brings the thermoplastic coating on the inside surface of the overcap into contact with the fibre base of the container as best shown in Fig. 4, and thus produces a permanent hermetic bond between them. The heat of fusion however in no way affects the waterproof and moistureproof coating on the overcap and therefore the overcap as a whole retains its waterproof and moistureproof characteristics. The thermoplastic coating having no affinity for the wax coating on the container can thus penetrate through the wax film without this penetrating effect inhibiting or adversely affecting the adhesive properties of the thermoplastic coating F.

The bond thus effected between the container and the overcap is so permanent that in tearing the overcap away to open the container, the fused edges remain intact on the container. When the overcap is removed as in tampering with the container contents, these clinging portions of the overcap are immediate and conclusive evidence of such tampering.

It has been found that these clinging portions cannot be peeled off without marring the surface of the container because the fusion heat during application of the overcap penetrates the wax coating and actually bonds with the container fibres and these fibres are visible on the fused portions of the overcap when they are removed. In fact the bond is so tight that the container may be readily subjected to the well known Methylene Blue solution test, as used for milk containers, with a perfect score of tightness.

It is thought that the invention and many of its attendant advantages will be understood from the foregoing description, and it will be apparent that various changes may be made in the form, construction and arrangement of the parts, and that changes may be made in the steps of the process described and their order of accomplishment without departing from the spirit and scope of the invention or sacrificing all of the material advantages, the form hereinbefore described being merely a preferred embodiment thereof.

I claim:

1. A sealed sanitary moisture and tamper-proof container, comprising a completed closed fibre container having a laterally projecting ledge at its upper end and a thermoplastic coated protective overcap of thin sheet material overlying the upper closed end of the container, the marginal portions of said overcap extending downwardly over and thence inwardly beneath the container ledge, the intermediate portion of said overcap being substantially flat, said outer marginal portions of the overcap being permanently fused and adhesively secured to the lower surface of said projecting container ledge in a permanent bond to provide a sanitary overcap which is proof against contamination and which when torn away leaves the fused portions of the overcap permanently secured to the container ledge as evidence of tampering.

2. A sealed sanitary moisture and tamper-proof container, comprising a completed and closed wax covered fibre container having a laterally projecting ledge at its upper end and a waterproof and moistureproof thermoplastic coated protective overcap composed of cellulosic film overlying the upper closed end of the container, the marginal portions of said overcap extending downwardly over and thence inwardly beneath the container ledge, the intermediate portion of said overcap being substantially flat, said outer marginal portions of the overcap being permanently fused and adhesively secured to the fibre material of the container on the under surface of the said projecting ledge, said thermoplastic coating of the overcap penetrating through the wax covering of the container and permanently bonded to the fibre of said ledge to provide a hermetic waterproof and moistureproof sanitary overcap permanently which when torn away leaves the fused portions of the overcap secured to the container ledge as evidence of tampering.

3. The method of applying a thermoplastic adhesively coated thin cellulosic overcap to the top end of a sealed wax-coated fibre container having a peripheral laterally projecting ledge to provide a sanitary moisture and tamper-proof package, said method comprising positioning centrally of the container top the said overcap having substantially the shame shape as the container top but of a dimension sufficiently greater to extend beyond said projecting ledge in all directions, folding the marginal portions of the overcap downwardly and thence inwardly and upwardly beneath said wax-coated ledge, and simultaneously heating the thermoplastic adhesive as the overcap margins engage beneath said container ledge while heating the wax coating on the ledge to permanently fuse and adhesively secure the marginal portions of the overcap to the ledge by penetration of said adhesive through the wax coating on the ledge into adhesive engagement with the fibrous ledge material, whereby to permanently secure the overcap to the container top to render the latter proof against contamination, moisture and tampering.

DONALD G. MAGILL.